(12) United States Patent
Gale et al.

(10) Patent No.: US 8,249,000 B2
(45) Date of Patent: Aug. 21, 2012

(54) CONTROLLING THE DELIVERY OF MESSAGES TO A MOBILE CLIENT

(75) Inventors: Martin J. Gale, Eastleigh (GB); Brian M. O'Connell, Cary, NC (US); Keith R. Walker, Austin, TX (US); Jeffrey D. Amsterdam, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 12/200,170

(22) Filed: Aug. 28, 2008

(65) Prior Publication Data

US 2010/0054193 A1    Mar. 4, 2010

(51) Int. Cl.
*G06F 17/00* (2006.01)
(52) U.S. Cl. ......... 370/329; 370/328; 370/332; 370/338
(58) Field of Classification Search .................... 370/329
See application file for complete search history.

(56) References Cited

U.S. PATENT DOCUMENTS

| | | | | |
|---|---|---|---|---|
| 5,448,759 | A | * | 9/1995 | Krebs et al. ................... 455/517 |
| 7,882,207 | B1 | * | 2/2011 | Titmuss et al. ............... 709/223 |
| 2007/0041557 | A1 | * | 2/2007 | Chatterjee et al. ........ 379/218.01 |

* cited by examiner

*Primary Examiner* — Kenny Lin
*Assistant Examiner* — Sulaiman Nooristany
(74) *Attorney, Agent, or Firm* — Jason H. Sosa; Mark C. Vallone; Ortiz & Lopez PLLC

(57) ABSTRACT

A method, system and computer usable-medium for prioritizing and controlling the delivery of messages to a mobile client capable of connecting to a network. Data can be collected utilizing an agent associated with a messaging application for the delivery of a message to the mobile client, wherein the data is indicative of one or more characteristics of a network to which the mobile client is currently connected, one or more characteristics of the message itself, and one or more characteristics of the mobile client. The data can be then analyzed, and thereafter a delivery decision is rendered with respect to the message, in response to analyzing such data in order to efficiently control the delivery of the message to the mobile client.

15 Claims, 4 Drawing Sheets

CONTROLLING THE DELIVERY OF MESSAGES TO A MOBILE CLIENT

TECHNICAL FIELD

Embodiments are generally related to telecommunication and wireless network systems. Embodiments are also related to pervasive mobile messaging applications. Embodiments are further related to methods for controlling the delivery of messages in a pervasive mobile messaging environment

BACKGROUND OF THE INVENTION

Wireless networks are often utilized to transmit messages from one location in a network to a destination location in the network. These messages include data to be supplied to the destination location. Mobile devices such as, for example, cellular telephones and wireless personal digital assistant (PDA) are enhanced with new features, such as the ability to consume data services over wireless networks. Mobile devices may roam between different types of wireless networks such as, for example, GPRS (General Packet Radio Service), Wi-Fi, Edge, 3G and so forth. Such wireless networks possess different qualities of service, speed, reliability and cost. With the increase in features and capabilities, some devices may be provided with the capability of consuming services that rely on pervasive messaging software. Pervasive messaging applications may actually function better on different mobile networks because of different network qualities.

Currently, methods do not exist for pervasive mobile messaging applications that are capable of discriminately controlling message delivery based on the network connection of a pervasive device. Current mobile devices may roam between different networks on a regular basis; hence, an application utilizing pervasive messaging must possess the ability to adapt to different networks without encountering problems in the delivery and control of messages through such varying networks. However, varying types of wireless networks have different characteristics such as speed, reliability, or cost. Thus, a pervasive messaging application may not function well, or may not be desirable, with respect to different types of networks. For example, it may not be desirable for an application that is sending relatively large amounts of data, or many messages, to be active while the mobile device accesses a relatively slow or expensive network. As the mobile device roams between networks and the pervasive application attempts to continue activity with respect to each new network, the costs associated may become expensive depending on the network accessed by the mobile device.

The majority of prior art pervasive messaging applications function with clients that are often disconnected, either by utilizing store and forward queues or other standard messaging constructs such as durable subscriptions. Such solutions, however, only detect if a client is connected or disconnected to the network. Some solutions permit network specification; however, these solutions do not permit intelligent policy decisions such as messages to be sent, held, or delayed based on network characteristics.

Based on the foregoing, it is believed that a need exists for an improved method and system for controlling the delivery of messages in a pervasive mobile messaging application based on the type of wireless network currently employed by a mobile device, as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved pervasive mobile messaging application.

It is another aspect of the present invention to provide for an improved method and system for controlling the delivery of messages in a pervasive mobile messaging environment.

The aforementioned aspects and other objectives and advantages can now be achieved as described herein. A method, computer system and computer usable storage medium are disclosed herein for prioritizing and controlling the delivery of messages to a mobile client capable of connecting to a network. Data can be collected utilizing an agent associated with a messaging application for the delivery of a message to a mobile client, wherein the data is indicative of one or more characteristics of a network to which the mobile client is currently connected, one or more characteristics of the message itself, and one or more characteristics of the mobile client. The data can be then analyzed and thereafter a delivery decision is rendered with respect to the message, in response to analyzing such data in order to efficiently control the delivery of the message to the mobile client.

Such an approach provides a framework for a mobile client (e.g., a mobile device) to transmit descriptive information about the network on which it is currently connected to the agent in a messaging application. In this manner, the agent can make "intelligent" message delivery decisions based on the characteristics of the message, the network and/or characteristics associated with the mobile client itself, such as, for example, user activity associated with the mobile client. The messaging application (e.g. a message agent, as described in greater detail herein) can collect information about the client, the network, the message itself, and then analyze this information to determine if a message should be sent. Such information may include, but is not limited to the type of network (WiFi, GPRS, etc . . . ), user bandwidth cost, the time of day, the message size, preference and priority settings, user activity, and so forth. Some of this information may be entered by a user and some may be automatically collected by the agent through inspection of messages or by data automatically sent from the mobile client.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
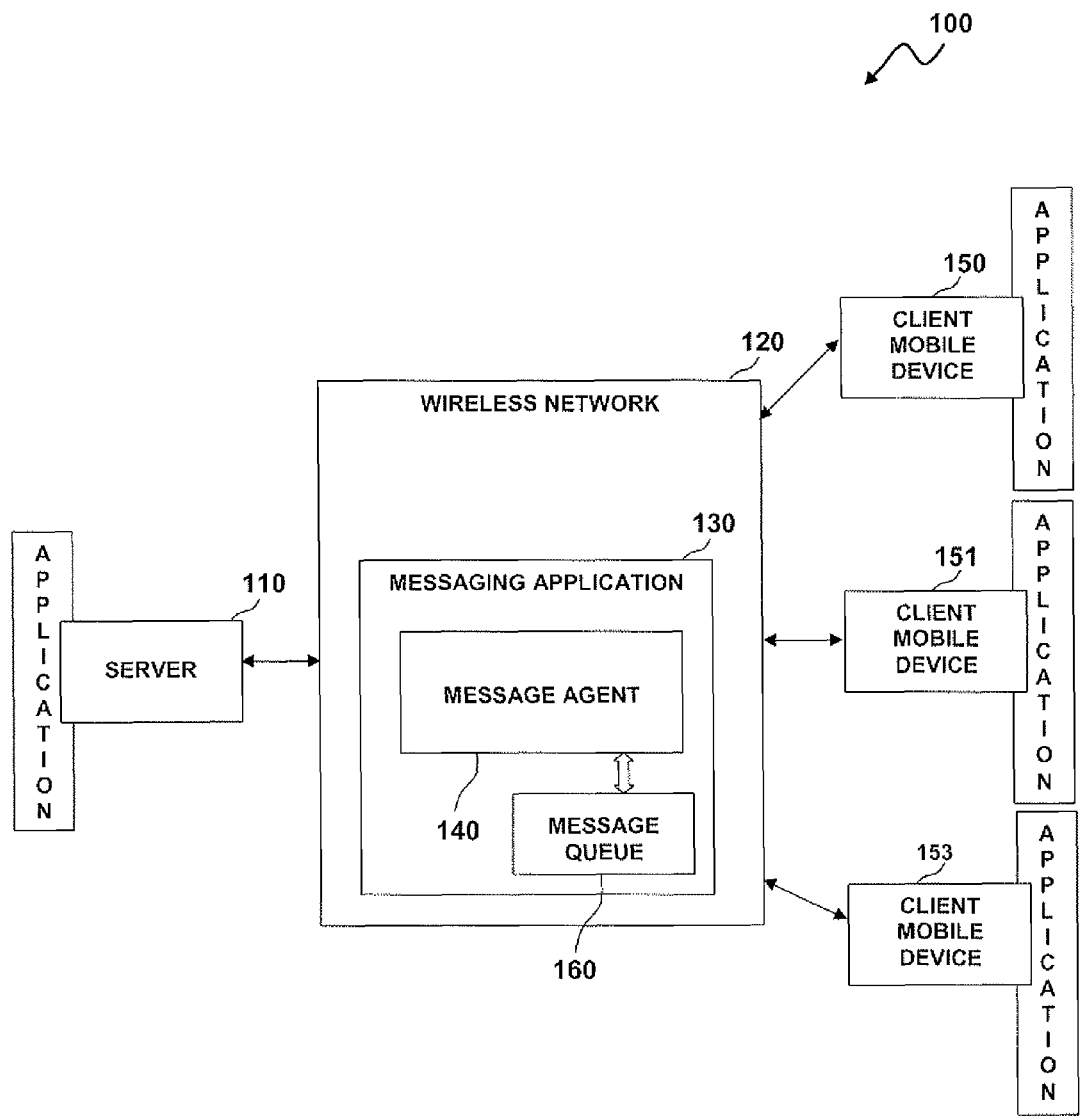
FIG. 1 illustrates a block diagram of a wireless network system associated with a message agent, which can be implemented in accordance with a preferred embodiment.

FIG. 1 illustrates a block diagram of a wireless network system 100 that includes the use of a message agent 140, in accordance with a preferred embodiment. The wireless network system 100 includes a server 110, a wireless network 120, and one or more client mobile devices, such as, for example, client mobile devices 150, 151 and/or 153. The server 110 is typically constituted as a computer system that operates to send and receive messages to and from one or more mobile devices 150, 151, and/or 153. The messages are generally blocks of data that are to be transmitted to one or more client mobile devices 150, 151 and/or 153. As an example, the data can pertain to various types of notifications, electronic mail, news data, etc. The server 110 may also connect to other wired or wireless networks to receive messages from or forward messages to other computer systems. As an example, the server 110 can be connected to the Internet. For example, the server 110 can be a link server coupled to the Internet or a network gateway coupled to a network.

The wireless network 120 can be provided as a network such as, for example, GPRS, WiFi and 3G and so forth. The wireless network 120 can also be utilized to wirelessly connect the server 110 with a number of client mobile devices such as the client mobile devices 150, 151, and/or 153. The wireless network(s) 120 can be generally implemented with some type of remote information transmission system that utilizes electromagnetic waves, such as radio waves. The wireless network system 100 further includes a messaging application 130 and a message agent 140. The message agent 140 can be utilized to analyze the messages in the network 120 from the server 110 to one or more of the client mobile devices 150, 151, and/or 153.

The messaging application 130 allows a user to set preferences and to create a framework for sending status information to the server 110. The message agent 140, which includes a message queue 160, can be utilized to render intelligent message delivery decisions such as, for example, sending the message, storing the message in a queue, or discarding the message based on the wireless network characteristics and/or the client mobile devices 150, 151, and/or 153. The client mobile devices 150, 151, and/or 153 can then store the message(s) and perform predetermined processing actions such as, for example, notifying one or more of the mobile devices 150, 151 and/or 153 of the reception of the message(s).

Figure 2:
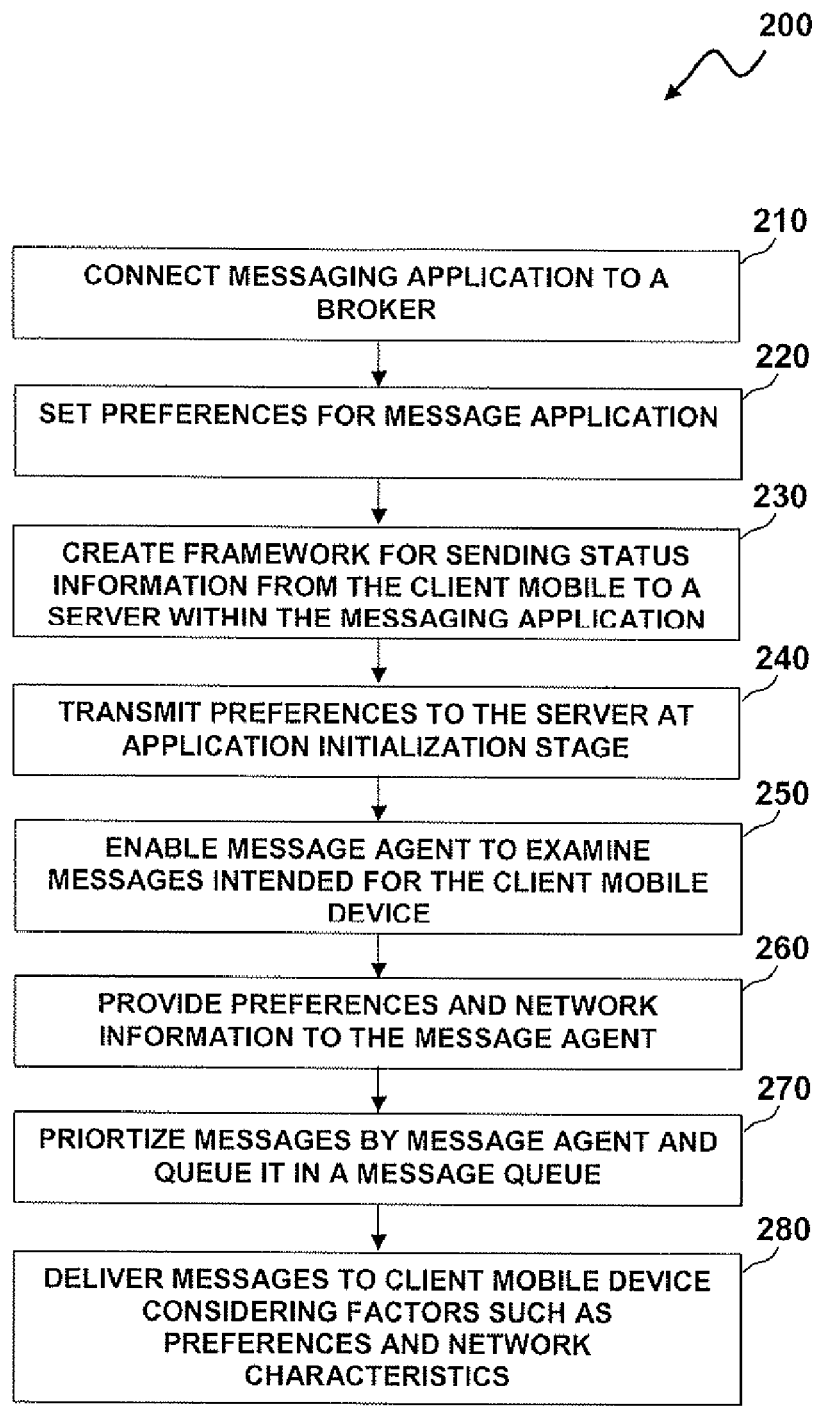
FIG. 2 illustrates a flow chart of operation illustrating logical operational steps of a method for controlling delivery of messages in a pervasive mobile messaging application based on type of wireless network currently employed by a mobile device, which can be implemented in accordance with a preferred embodiment.

FIG. 2 illustrates a flow chart of operation illustrating logical operational steps of a method 200 for controlling delivery of messages in a pervasive mobile messaging application 130 based on the type of wireless network 120 currently employed by the client mobile device 150, 151, and/or 153 in accordance with a preferred embodiment. Note that in FIGS. 1-4, identical or similar blocks are generally indicated by identical reference numerals. A messaging application 130 can be connected to the message agent 140, as illustrated at block 210. Preferences for the messaging application 130 can be designated, as depicted at block 220. Further, as illustrated at block 230, a framework can be created for sending status information from the client mobile devices 150, 151, and/or 153 to the server 110. The preferences can be transmitted to the server 110 at an application initialization stage via the messaging application 130, as illustrated at block 240.

The message agent 140 can be enabled to examine messages intended for one or more of the client mobile devices 150, 151, and/or 153 from the server 110, as depicted at block 250. The preferences of the client mobile devices 150, 151, and/or 153 and the information regarding wireless network 120 can be provided to the message agent 140, as illustrated at block 260. Note that the client preferences can be preferences, such as, for example, the type of network, client bandwidth cost, the time of day, message size, user activity, user preferences, priority settings, etc. The message agent 140 prioritizes the messages to the client mobile devices 150, 151, and/or 153 and queues the message (or messages) in a message queue 160, as depicted at block 270. The queued message(s) from the message queue 160 can be then delivered to the client mobile devices 150, 151, and/or 153 based on the client preferences and wireless network characteristics, as depicted at block 280.

The wireless network system 100 can be utilized to store the user preferences and transmit to the server 110 at application initialization stage. The server 110 can also store information about the user to provide client information and registration to the messaging application 130. The message agent 140 can be utilized to transmit the message from the server 110 to a client mobile device 150 by utilizing bandwidth of wireless network 120. The message agent 140 can consider factors such as the type of network, user bandwidth costs, time of day, message size, user activity, user preferences, priority settings, and so forth, while transmitting messages between the network 120 and the client mobile devices 150, 151, and/or 153.

Figure 3:
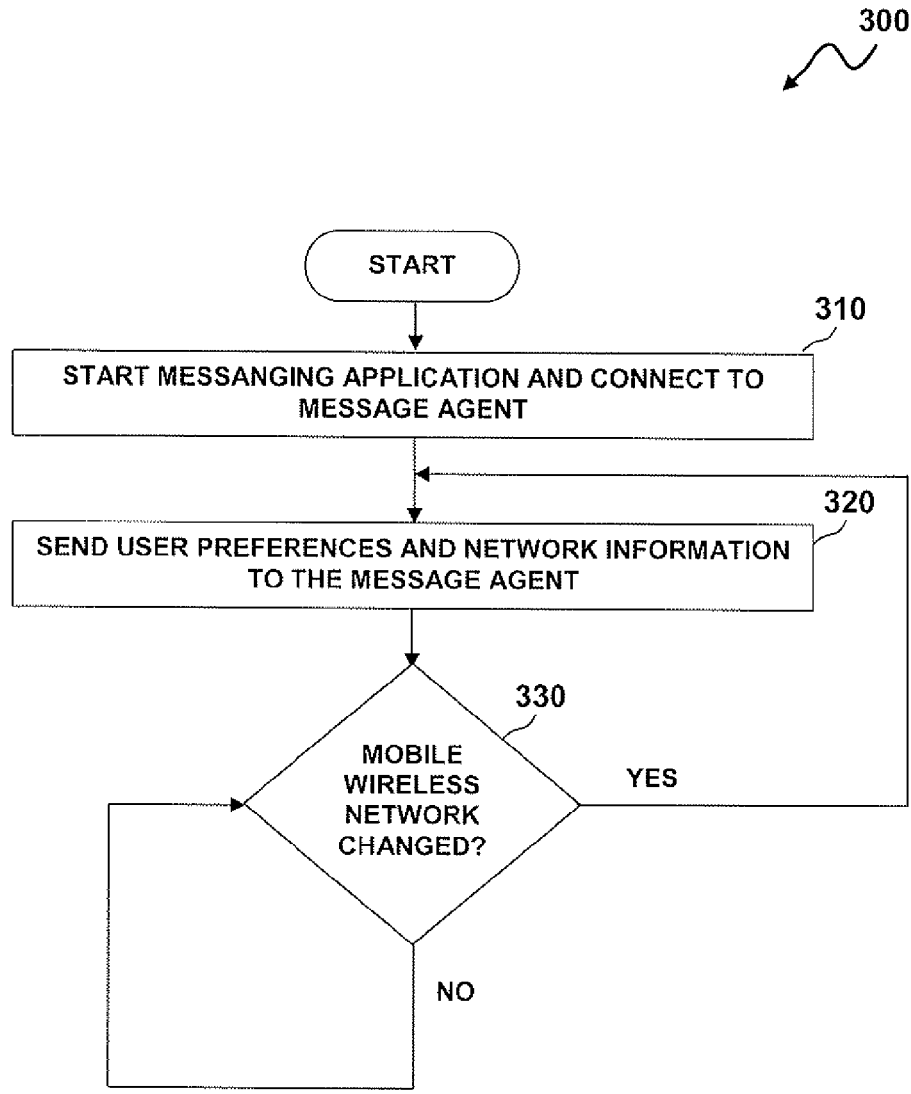
FIG. 3 illustrates a flow chart of operation illustrating logical operational steps of a method for sending user preference and network information to the message agent, which can be implemented in accordance with a preferred embodiment.

FIG. 3 illustrates a flow chart of operation illustrating logical operational steps of a method 300 for sending preferences and network information to the message agent 140, in accordance with an alternative embodiment. The messaging application 130 can be initiated and then connected to the message agent 140, as illustrated at block 310. Preferences and information regarding the wireless network 120 can be provided to the message agent 140, as depicted at block 320. The message agent 140 can consider the information regarding the wireless network 120 such as type of network, client bandwidth cost, the time of day, message size, user activity, user preferences, priority, and so forth.

The wireless network 120 may be a type of network that is faster, allows for more bandwidth, and possesses different cost structures. For example, if the mobile devices 150, 151, and/or 153 are connected to a wireless network with respectively less bandwidth or speed, the messages can be prioritized based on the size of the messages. The type of network that the mobile device 150 is currently utilizing can be sent in the connection or keep-alive/status messages or any other message from the client within the context of the messaging application 130. The different costs of networks, for example, can be utilized by the agent 140 to help prioritize messages for delivery. For example, the cost structure of a particular network 120 may be stored and then potentially pre-populated by the network provider, on the agent 140. In other embodiments, the client mobile devices 150, 151, and/or 153 can be configured to contain descriptive data of the wireless network pricing structure and then transmits the data to the server application 110. The cost structure can also be provided as a part of the initial registration for the messaging application 130.

The message agent 140 can also be configured to consider the time of day in prioritizing messaging to the client mobile devices 150, 151, and/or 153. The message agent 140 can be configured to detect the time of day currently associated with the client mobile devices 150, 151, and/or 153 and then deliver, discard or store messages accordingly. Time of day information can be transmitted by the mobile devices 150, 151, and/or 153 to the message agent 140 as part of the connection initialization. Also, the message agent 140 can be configured to detect the time of day from the IP addresses respectively associated with the client mobile devices 150, 151, and/or 53, or other known methods to triangulate mobile clients.

The message agent 140 can be further configured to analyze the size of the message to be transferred to the client mobile device 150 and prioritizes the messages in accordance with the size of the message. Larger messages may take a longer amount of time to send, noticeably on a slower network, and may cost more when sent via a network with high per-kilobyte bandwidth costs. Hence, larger messages with respectively larger sizes can be discarded, saved or sent when the mobile devices 150, 151, and/or 153 are connected to the wireless network 120 with appropriate bandwidth, speed and flat cost structures. The message agent 140 can also consider other factors, such as user activity, user preferences and priority settings, for example, to prioritize message delivery to the client mobile devices 150, 151, and/or 153.

For example, in one possible scenario, a user may decline all message deliveries when roaming on a particular wireless network. The client application 150 can store such information. When the device roams onto a specified network, the application 130 can send a message to message agent 140, thereby placing a hold on all messages for the client. When the mobile client moves to a different network, the application can send a message requesting resumption of message delivery. The message can also be sent if the client is forced to reconnect due to temporary network outages. Other user preferences may include, for example, the time of day, along with message size and message subject. Additionally, if a mobile client detects that activity has ceased, for example, during an overnight period, but the messaging application 130 continues to run, a message may be transmitted to message agent 140 requesting that message delivery be suspended.

When activity is next registered, a message can be sent, requesting that the agent 140 resume message delivery. Such an approach can save unnecessary messages from being sent, for example, during a time that a user is unable to actually view these messages via the mobile client, thereby resulting in reduced networked costs and expanded battery life with respect to the wireless device utilized. Note that the disclosed embodiments can be further utilized to suspend the delivery of messages for a maximum specified duration (e.g., either by the agent 140 or the application 130), if the suspension of messages for a duration equal to or less than specified would result in a less costly message delivery.

Later, a determination can be made as to whether the wireless network 120 has been changed, as depicted at block 330. If it is determined that the wireless network 120 has been altered, the mobile client system 100 can continue to send client preferences and network information to the message agent 140. Otherwise, the mobile client system 100 may roam on the same network and transfer the messages from the server 110 to the client mobile devices 150, 151, and/or 153.

Figure 4:
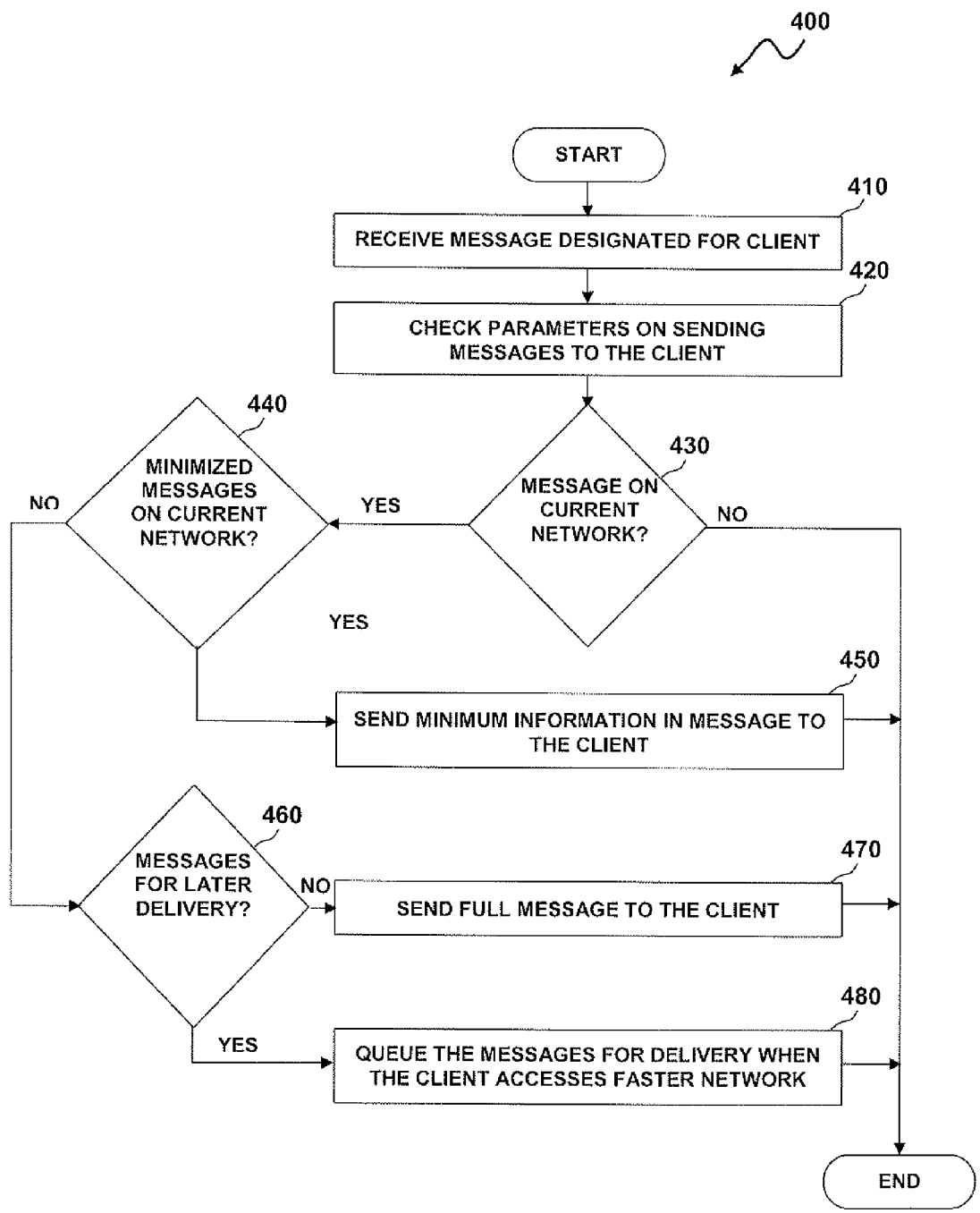
FIG. 4 illustrates a flow chart of operation illustrating logical operational steps of a method for controlling delivery of messages in a pervasive mobile messaging application, in accordance with an exemplary embodiment.

FIG. 4 illustrates a flow chart of operation illustrating logical operational steps of a method 400 for controlling delivery of messages in a pervasive mobile messaging application, in accordance with a preferred embodiment. A message designated for one or more client mobile devices 150, 151 and/or 153 from the server 110 can be received by the message agent 140, as illustrated at block 410. Network parameters such as the type of network, client bandwidth cost, time of day, message size, user activity, user preferences and priority settings can be checked on sending messages to the client mobile device 150, 151, and/or 153, as illustrated at block 420.

Thereafter, as depicted at block 430, a determination can be made as to whether any messages are on or associated with the current wireless network 120. If it is determined that messages are to be sent with respect to the current wireless network 120, another determination can be made as to whether minimized messages are to be sent or utilized with respect to current network 120, as depicted at block 440. Otherwise, the process terminates. As depicted at block 440, if minimized messages are to be processed with respect to the network 120, minimized information can be then sent to the client mobile device 150 and the process then terminated, as illustrated at block 450.

Otherwise, a determination can be made as to whether messages are to be delivered at a later time, as depicted at block 460. If messages are to be delivered later, such messages for later delivery can be queued when the client is connected to a faster network 120, as illustrated at block 480. The process can thereafter terminate. Otherwise, a full message can be sent to the client mobile devices 150, 151 and/or 153 as illustrated at block 470 and the process then terminated. The central messaging agent 140 can thus be utilized to selectively deliver, defer, or perform other operations based on the bandwidth available. Such an approach allows for more accurate cost estimates with respect to the use of mobile devices 150, 151 and/or 153, while encouraging use of the application.

Consider an example involving real time messaging applications such as news applications, which are capable of sending breaking news stories in real time to mobile client system 100. Messages that include such news information can be sent at any time and may contain a variable amount of data. However, instant notification of some of these stories or the ability to read the entire story, including pictures and videos, may not be critical. Therefore, preferences can be set ahead of time instructing the message agent 130 to hold or send titles only for breaking news stories and/or when the mobile devices 150, 151, and/or 153 are connected to an expensive and slow network, or when a period of inactivity is detected for particular amount of time (e.g., for more than 30 minutes). As each message is added to the queue to be sent to a client application, the agent 140 examines the message(s) for content and size. Such conditions, as well as any other parameters that have been preset, can all be analyzed to determine if a message(s) should be sent "as is", or must be modified to a smaller size, held in queue until the device is on a different network, or simply discarded.

Such an approach can "intelligently" and efficiently utilize available bandwidth for a mobile messaging application, while limiting bandwidth costs. Hence, in a pervasive messaging application information such as the number of messages or the amount of data that can be sent during an active period for the application can be pre-set. Such information allows for a more accurate prediction of costs associated with running a messaging application via mobile clients 150, 151, and/or 153 and a particular wireless network. Parameters can be preset, for example, to allow the agent 140 to control the sending of messages based on bandwidth costs associated with varying networks, while allowing for more accurate estimate costs and encouraging use of the application.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for prioritizing and controlling the delivery of messages to a mobile client device, the method comprising the steps of:
   a computer receiving, from a mobile client device, at least one characteristic of a network to which the mobile client device is currently connected;
   the computer determining one or more preferences of the mobile client device for receiving messages, the one or preferences based, at least in part, on the at least one characteristic of the network to which the mobile client device is currently connected;
   the computer receiving a message directed to the mobile client device from a server computer;
   the computer analyzing the message for at least one characteristic of the message;
   the computer determining whether to send the message to the mobile client device based on a comparison of the at least one characteristic of the message with the one or more preferences of the mobile client device for receiving;
   responsive to determining not to send the message to the mobile client device, the computer placing the message into a queue for subsequent delivery to the mobile client device;
   the computer receiving a subsequent message for delivery to the mobile client device;
   the computer determining that the subsequent message has a higher priority than the message in the queue based on a comparison of at least one characteristic of the subsequent message to the one or more preferences;
   the computer placing the subsequent message into the queue to be delivered prior to the message; and
   the computer discarding the message so that the message is not delivered after delivery of the subsequent message;
   wherein the at least one characteristic of the network is selected from the group consisting of: a type of the network, bandwidth costs associated with the network, connectivity of the network, and a network pricing structure.

2. The method of claim 1 wherein the at least one characteristic of the message includes a size of the message.

3. A computer system for prioritizing and controlling the delivery of messages to a mobile client device, the computer system comprising:
   a processor; and
   a computer-usable storage medium comprising computer executable instructions for execution by the processor, the computer executable instructions comprising:
      computer executable instructions to receive, from a mobile client device, at least one characteristic of a network to which the mobile client device is currently connected;
      computer executable instructions to determine one or more preferences of the mobile client device for receiving messages, the one or more preferences based, at least in part, on the at least one characteristic of the network to which the mobile client device is currently connected;
      computer executable instructions to receive a message directed to the mobile client device from a server computer;
      computer executable instructions to analyze the message for at least one characteristic of the message;
      computer executable instructions to determine whether to send the message to the mobile client device based on a comparison of the at least one characteristic of the message with the one or more preferences of the mobile client device for receiving messages;
      computer executable instructions to, responsive to determining not to send the message to the mobile client device, place the message into a queue for subsequent delivery to the mobile client device;
      computer executable instructions to receive a subsequent message for delivery to the mobile client device;
      computer executable instructions to determine that the subsequent message has a higher priority than the message in the queue based on a comparison of at least one characteristic of the subsequent message to the one or more preferences;
      computer executable instructions to place the subsequent message into the queue to be delivered prior to the message; and
      computer executable instructions to discard the message so that the message is not delivered after delivery of the subsequent message;
   wherein the at least one characteristic of the network is selected from the group consisting of: a type of the network, bandwidth costs associated with the network, connectivity of the network, and a network pricing structure.

4. A non-transitory computer-usable storage medium having computer executable instructions stored thereon, the computer executable instructions for execution by a computer to prioritize and control the delivery of messages to a mobile client device, the computer executable instructions comprising:
   computer executable instructions to receive, from a mobile client device at least one characteristic of a network to which the mobile client device is currently connected;
   computer executable instructions to determine one or more preference of the mobile client device for receiving messages, the one or more preferences based, at least in part, on the at least one characteristic of the network to which the mobile client device is currently connected;
   computer executable instructions to receive a message directed to the mobile client device from a server computer;
   computer executable instructions to analyze the message for at least one characteristic of the message;
   computer executable instructions to determine whether to send the message to the mobile client device based on a comparison of the at least one characteristic of the message with the one or more preferences of the mobile client device for receiving messages;
   computer executable instructions to, responsive to determining not to send the message to the mobile client device, the computer placing the message into a queue for subsequent delivery to the mobile client device;
   computer executable instructions to, receive a subsequent message for delivery to the mobile client device;
   computer excutable instructions to determine that the subsequent message has a higher priority than the message in the queue based on a comparison of at least one characteristic of the subsequent message to the one or more preferences;
   computer excutable instructions to place the subsequent message into the queue to be delivered prior to the message; and computer executable instructions to discard the message so that the message is not delivered after delivery of the subsequent message;
wherein the at least one characteristic of the network is selected from the group consisting of: a type of the network, bandwidth costs associated with the network, connectivity of the network, and a network pricing structure.

5. The computer-usable storage medium of claim 4 wherein the at least one characteristic of the network is selected from the group consisting of: a type of the network, bandwidth costs associated with the network, connectivity of the network, and a network pricing structure.

6. The non-transitory computer-usable storage medium of claim 4 wherein the at least one characteristic of the message includes a size of the message.

7. The method of claim 1, further comprising the step of the computer sending the one or more preferences to the server computer from which the computer received the message directed to the mobile client device.

8. The method of claim 1, wherein the step of determining whether to send the message to the mobile client device based on a comparison of the at least one characteristic of the message with the one or more preferences of the mobile client device for receiving messages comprises:
    responsive to determining that a size of the message is greater than or equal to a predetermined size at which messages can be delivered based on the at least one characteristic of the network:
        the computer minimizing information of the message; and
        the computer sending the information to the mobile client device.

9. The method of claim 8, wherein the message comprises one or more news stories; and
    wherein the step of the computer sending the information to the mobile client device comprises the computer sending only one or more titles of the one or more news stories to the mobile client device.

10. The method of claim 1, wherein the one or more preferences of the mobile client device for receiving messages are further based on at least one characteristic of the mobile client device.

11. The method of claim 10, wherein the at least one characteristic of the mobile client device includes a characteristic selected from the group consisting of: a type of user activity, an amount of user activity, and user preferences sent from the mobile client device to the computer.

12. The non-transitory computer-usable storage medium of claim 6, further comprising computer executable instructions, stored on the computer-usable storage medium, to send the one or more preferences to the server computer from which the computer received the message directed to the mobile client device.

13. The non-transitory computer-usable storage medium of claim 4, wherein the computer executable instructions to determine whether to send the message to the mobile client device based on a comparison of the at least one characteristic of the message with the one or more preferences of the mobile client device for receiving messages, comprise computer executable instructions to:
    responsive to determining that a size of the message is greater than or equal to a predetermined size at which messages can be delivered based on the at least one characteristic of the network: minimize information of the message; and send the information to the mobile client device.

14. The non-transitory computer-usable storage medium of claim 13, wherein the message comprises one or more news stories; and wherein the computer executable instructions to send the information to the mobile client device comprises computer executable instructions to send only one or more titles of the one or more news stories to the mobile client device.

15. The non-transitory computer-usable storage medium of claim 4, wherein the one or more preferences of the mobile client device for receiving messages are further based on at least one characteristic of the mobile client device.

* * * * *